US009026172B2

(12) United States Patent
Ruan et al.

(10) Patent No.: US 9,026,172 B2
(45) Date of Patent: May 5, 2015

(54) METHOD, SYSTEM AND APPARATUS FOR MANAGING TRANSPORTS (75) Inventors: Zhigang Ruan, Waterloo (CA); Marian Constantin Buzdugan, Ottawa (CA)

(73) Assignee: Blackberry Limited, Waterloo, Ontario (CA)

(*) Notice: Subject to any disclaimer, the term of this patent is extended or adjusted under 35 U.S.C. 154(b) by 0 days.

(21) Appl. No.: 12/844,328

(22) Filed: Jul. 27, 2010

(65) Prior Publication Data
US 2011/0263246 A1 Oct. 27, 2011

Related U.S. Application Data (60) Provisional application No. 61/328,050, filed on Apr. 26, 2010.

(51) Int. Cl.
H04M 1/00 (2006.01)
H04W 88/06 (2009.01)
H04W 48/18 (2009.01)
H04L 12/54 (2013.01)

(52) U.S. Cl.
CPC ........... H04W 48/18 (2013.01); H04L 12/5691 (2013.01)

(58) Field of Classification Search
USPC .......... 455/552.1, 127.4, 167.1, 550.1–553.1, 455/3.04, 426.1, 432.1–437; 370/334, 339
See application file for complete search history.

(56) References Cited

U.S. PATENT DOCUMENTS

| 2006/0013176 | A1* | 1/2006 | De Vos et al. ............... 370/338 |
| 2006/0025141 | A1 | 2/2006 | Marsh et al. |
| 2009/0022103 | A1 | 1/2009 | Shatsky |
| 2009/0023450 | A1 | 1/2009 | George et al. |
| 2009/0068969 | A1 | 3/2009 | Lindoff et al. |
| 2009/0131045 | A1 | 5/2009 | Feuer et al. |
| 2009/0170519 | A1 | 7/2009 | Wilhoite et al. |
| 2009/0191864 | A1 | 7/2009 | Mousseau et al. |
| 2010/0009674 | A1* | 1/2010 | Sapkota et al. ............ 455/426.1 |
| 2010/0083121 | A1 | 4/2010 | Famolari et al. |
| 2010/0097956 | A1* | 4/2010 | Tauil et al. .................... 370/254 |

FOREIGN PATENT DOCUMENTS

| WO | 01/35585 A1 | 5/2001 | |
| WO | 2004/031488 A2 | 4/2004 | |
| WO | WO 2004031488 A1 * | 4/2004 | ............... E01F 9/06 |

OTHER PUBLICATIONS

Ionnas Modeas et al. "An Algorithm for Radio Resources Management in Integrated Cellular/WLAN Networks." 18th Annual IEEE International Symposium on Personal, Indoor and Mobile Communications (PIMRC 2007), Issued Sep. 3-7, 2007.*

European Patent Application No. 10171250.3 Search Report mailed Oct. 12, 2010.

(Continued)

*Primary Examiner* — San Htun
*Assistant Examiner* — Erica Navar
(74) *Attorney, Agent, or Firm* — Perry + Currier Inc.

(57) ABSTRACT

According to embodiments described in the specification, a method, system and apparatus for managing transports is provided. The method comprises: maintaining a transport preference in a memory of the mobile electronic device, the transport preference including an identifier of a preferred transport; monitoring available transports; and selecting a transport for use based on the transport preference and the available transports.

16 Claims, 7 Drawing Sheets (56) References Cited

OTHER PUBLICATIONS

Phil Hochmuth, Network World, downloaded from http://news.techworld.com/mobile-wireless/1981/new-phones-to-crack-the-wi-fi-cell-puzzle/.

Windows Phone, downloaded from http://news.techworld.com/mobile-wireless/1981/new-phones-to-crack-the-wi-fi-cell-puzzle/.

Brian Klug, AT&T 3G MicroCell: A Comprehensive Exploration, downloaded from http://www.anandtech.com/show/3626/att-3g-microcell-a-comprehensive-exploration/1.

Team VoWlan Solution—Motorola USA, downloaded from http://www.motorola.com/business/v/index.jsp?vgnextoid=c70d7db281b98110VgnVCM1000008406b00aRCRD&vgnextchannel=a287f6f861aa5110VgnVCM1000008406b00aRCRD.

Motorola unveils VoWLAN smartphones, downloaded from http://searchvoip.techtarget.com.au/articles/27744-Motorola-unveilsVoWLAN-smartphones.

Ioannis Modeas et al: "An Algorithm for Radio Resources Management in Integrated Cellular/WLAN Networks", IEEE International Symposium on Personal, Indoor and Mobile Radio Communications. PIMRC, IEEE; PI XX, Sep. 1, 2007, pp. 1-5, XP031168809, ISBN: 978-1-4244-1143-6.

Corresponding European Patent Application No. 10170934.3 Search Report dated Mar. 24, 2011.

\* cited by examiner

| Name | Wi-Fi Preferred |
|---|---|
| Preferred Transport | Wi-Fi |
| Fallback Transport | Mobile |

236b

| Name | Mobile Preferred |
|---|---|
| Preferred Transport | Mobile |
| Fallback Transport | Wi-Fi |

236c

| Name | Wi-Fi Only |
|---|---|
| Preferred Transport | Wi-Fi |
| Fallback Transport | |

236d

| Name | Mobile Only |
|---|---|
| Preferred Transport | Mobile |
| Fallback Transport | |

METHOD, SYSTEM AND APPARATUS FOR MANAGING TRANSPORTS

FIELD

The specification relates generally to communications transports, and specifically to a method, system and apparatus for managing transports.

BACKGROUND

The computational capabilities of mobile electronic devices (such as cellular phones, smart phones and the like), as well as the capabilities of their associated networks, continue to grow. At the same time, ever greater demands for increased functionality are imposed on such devices and networks. Thus, despite the growing capabilities of mobile devices and wireless networks, they remain less able to meet those demands than their mains-powered and wired counterparts.

BRIEF DESCRIPTIONS OF THE DRAWINGS

Embodiments are described with reference to the following figures, in which.

DETAILED DESCRIPTION OF THE EMBODIMENTS

According to an aspect of the specification, a method of managing transports at a mobile electronic device is provided, the method comprising: maintaining a transport preference in a memory of the mobile electronic device, the transport preference including an identifier of a preferred transport; monitoring available transports; and selecting a transport for use based on the transport preference and the available transports.

According to a further aspect of the specification, a mobile electronic device is provided, comprising: a memory for maintaining a transport preference, the transport preference including an identifier of a preferred transport; a communications interface; and, a processor interconnected with the memory and the communications interface, the processor configured to monitor available transports and to select a transport for use based on the transport preference and the available transports.

According to another aspect of the specification, a computer readable storage medium is provided for storing computer readable instructions for execution by a processor, the computer readable instructions implementing a method of managing transports, the method comprising: maintaining a transport preference in a memory of the mobile electronic device, the transport preference including an identifier of a preferred transport; monitoring available transports; and, selecting a transport for use based on the transport preference and the available transports.

Figure 1:
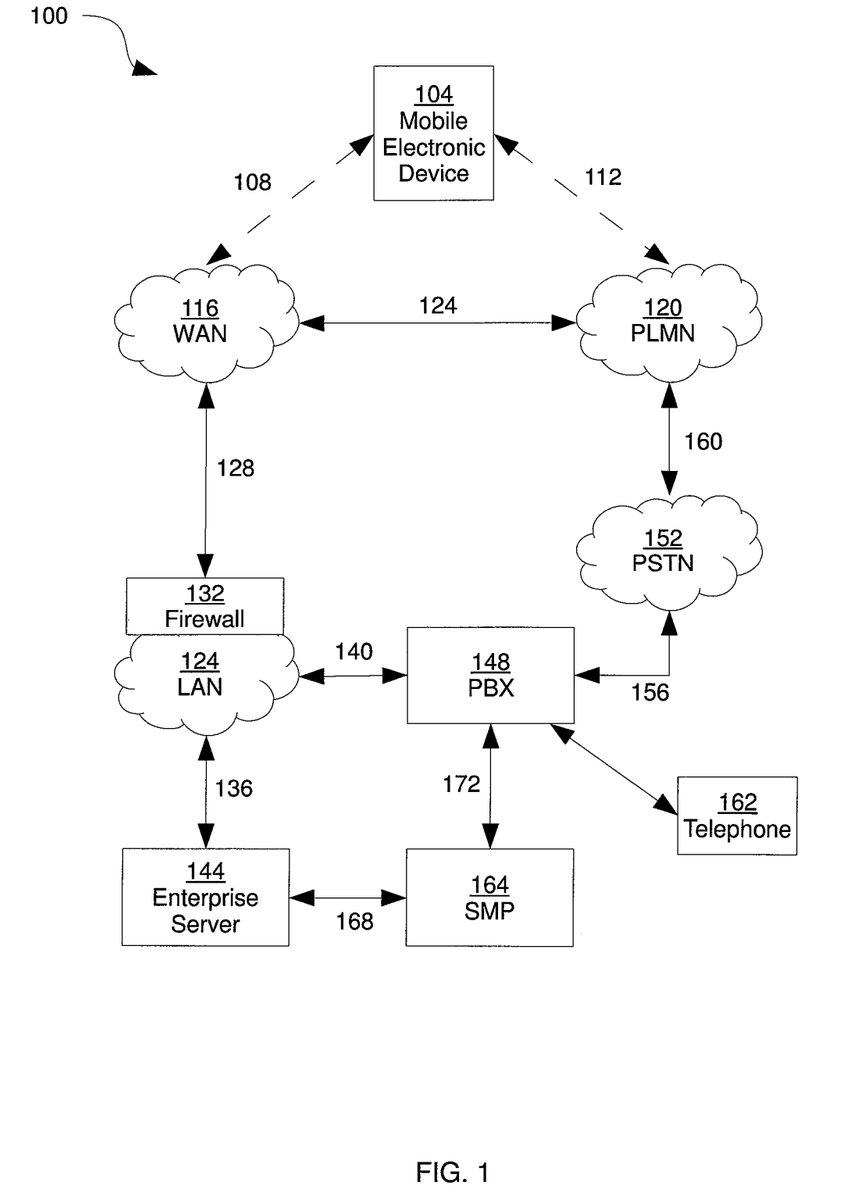
FIG. 1 depicts a system for managing calls, according to a non-limiting embodiment.

FIG. 1 depicts a system 100 for managing calls over various transports. It will now be apparent that although reference may be made herein to "calls," the described systems and methods are applicable to session-based communications in general and not limited to voice calls. It will also be appreciated that the systems and methods need not be limited to sessions and may also be applicable to messaging-based communications in some embodiments.

System 100 includes a mobile electronic device 104, which in the present embodiment is based on the computing environment and functionality of a hand-held wireless communication device. It will be understood, however, that mobile electronic device 104 is not limited to a hand-held wireless communication device. Other mobile electronic devices are possible, such as cellular telephones, smart telephones, Personal Digital Assistants ("PDAs"), media or MP3 players, laptop computers and the like.

Mobile electronic device 104 is operable to communicate over one or both of a first wireless link 108 based on a Wireless Local Area Network (WLAN, i.e. Wi-Fi) transport (in general, a transport based on the Institute of Electrical and Electronic Engineers ("IEEE") 802.11 standards) and a second wireless link 112 based on a mobile transport (such as, for example, Global System for Mobile communications ("GSM"), General Packet Radio Service ("GPRS"), Enhanced Data rates for GSM Evolution ("EDGE"), Code Division Multiple Access ("CDMA") and the third-generation mobile communication system (3G)).

Link 108 connects mobile electronic device 104 to a Wide Area Network (WAN) 116 such as the Internet, while link 112 connects mobile electronic device 104 to a Public Land Mobile Network (PLMN) 120. It will be appreciated that networks 116 and 120 can also be connected, for example via a link 124. It will be understood that links 108 and 112 each include any access points and/or base stations, and backhaul links necessary to connect mobile electronic device 104 to networks 116 and 120, respectively.

System 100 also includes a Local Area Network (LAN) 124, such as an enterprise intranet, which can be accessible from WAN 116 via a link 128 and a firewall 132. Connected to LAN 124 via respective links 136 and 140 are an enterprise server 144 and a Private Branch eXchange (PBX) 148. It will be understood that although it is simply referred to as "PBX" herein, in some embodiments PBX 148 can be an IP PBX. In addition to LAN 124, PBX 148 can be connected to the Public Switched Telephone Network (PSTN) 152 via a link 156. It will now be apparent that PBX 148 can also communicate with PLMN 120 via link 156, PSTN 152 and a further link 160. PBX 148 can also be connected to any number of enterprise-associated telephone sets, such as telephone set 162, which can be digital or analog.

System 100 also includes a Session Management Platform (SMP) 164 connected to enterprise server 144 via a link 168 and to PBX 148 via a link 172. It will be understood that enterprise server 144 and SMP 164 can be based on any suitable server computing environment that will occur to those skilled in the art. SMP 164, in conjunction with PBX 148, can extend various features of enterprise telephony to mobile electronic devices 104. For example, SMP 164 and PBX 148 can allow mobile electronic device 104 to perform functions akin to those normally available on a standard office telephone, such as telephone set 162. Examples of such features include, but are not limited to, direct extension dialing, enterprise voice mail, conferencing, call transfer, call park and the like.

SMP 164 can act to manage calls in which mobile electronic device 104 participates by initiating and managing, over link 172, both the call session between PBX 148 and mobile electronic device 104 (i.e. the "trunk" session) and the call session between PBX 148 and the other party or parties to the call (i.e. the "line" session or sessions), which may be telephones internal to LAN 124 such as telephone 162 as well as other devices which are not associated with the enterprise (e.g. mobile electronic devices, telephones, personal computers executing telephony applications, and the like).

It will now be apparent that mobile electronic device 104 can participate in calls via either one of links 108 (i.e. a Voice over WLAN, or VoWLAN, call) and 112 (i.e. a mobile or cellular call). When mobile electronic device 104 participates in a call via link 108, call media (e.g. voice streams, video streams and so on) is carried over link 108 to and from WAN 116 and over link 128 to and from LAN 124. Within LAN 124, call media can be carried over link 140 to and from PBX 148 for transfer to and from the other party or parties to the call. It will be appreciated that in some embodiments, call media can also travel to and from PBX 148 via SMP 164 and enterprise server 144.

When mobile electronic device 104 participates in a call via link 112, call media is carried over link 112 to and from PLMN 120. Call media can then be carried to and from PBX 148 via links 160 and 156. Call data (i.e. signalling) can be carried to and from WAN 116 either via link 108, or via links 112 and 124. Call data can then be carried to and from SMP 164 via links 128, 136 and 168. In other words, the path taken by call data is not necessarily determined by the path taken by call media. For instance, in some embodiments call media may only be permitted to travel over a mobile transport (i.e., links 112, 160 and 156) but call data may be free to travel over any transport.

It will now be apparent to those skilled in the art that SMP 164 must manage call sessions differently depending on which transport—that is, which one of links 108 and 112—mobile electronic device 104 will make use of for media transmission and reception during a call. In general, mobile electronic device 104 can be configured to select a transport for call media and to inform SMP 164 of the selected transport, as discussed in greater detail below.

Figure 2:
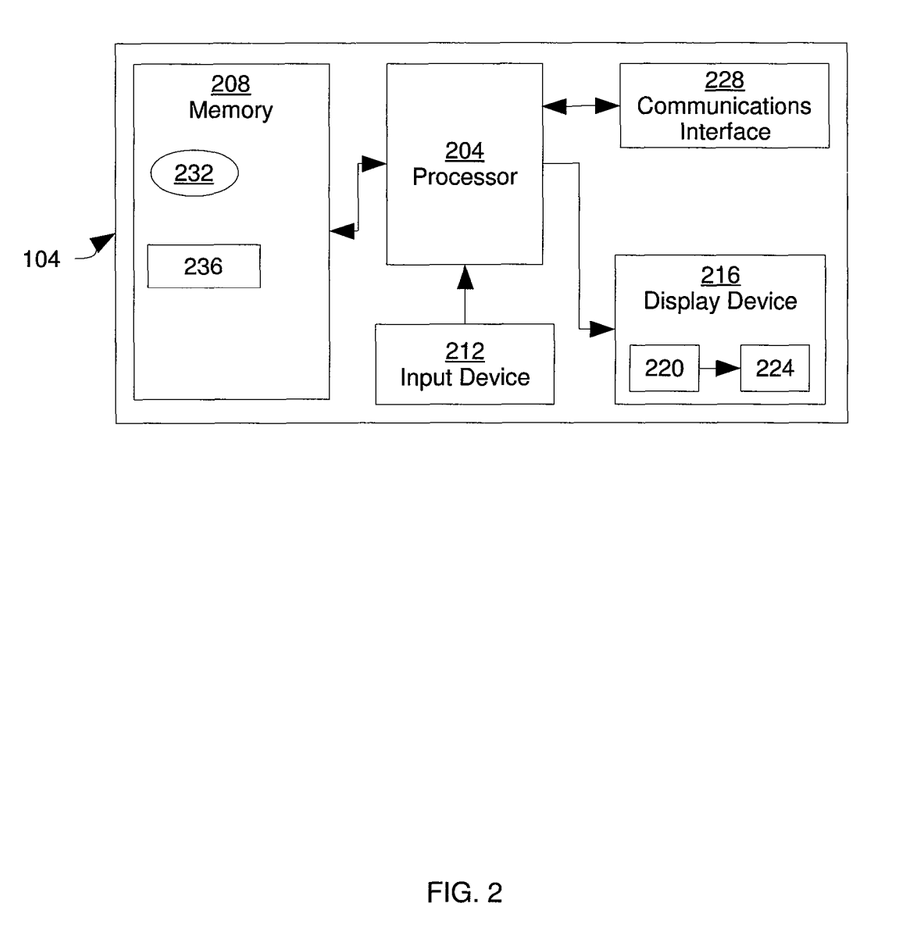
FIG. 2 depicts a schematic block diagram of a mobile electronic device of FIG. 1, according to a non-limiting embodiment.

Referring now to FIG. 2, certain internal components of mobile electronic device 104 are shown in greater detail. Mobile electronic device 104 includes a processor 204 interconnected with a memory 208. Memory 208 can comprise any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Mobile electronic device 104 also includes an input device 212 interconnected with processor 204. Input device 212 is generally configured to provide input data to processor 204 and can include any suitable one of, or combination of, keypads, microphones, touch screens and the like.

Mobile electronic device 104 also includes a display device 216. Display device 216 includes display circuitry 220 for generating representations, such as representation 224, of data. Display device 216 and circuitry 220 can be controlled by processor 208 for generating representations. It will now be apparent that display device 216 can include any suitable one of, or combination of, a flat panel display (e.g. Liquid Crystal Display (LCD), Organic Light Emitting Diode (OLED), plasma), a Cathode Ray Tube (CRT) display, and the like. It will also now be apparent that in some embodiments input device 212 can be a touch screen integrated with display device 216. Circuitry 220 can include any suitable combination of circuitry for controlling the relevant combination of flat panel display, CRT display and the like. Circuitry 220 can therefore include, but is not limited to, display buffers, transistors, LCD cells, plasmas cells, phosphors, electron beam controllers and the like. As will be appreciated by those skilled in the art, display buffers can comprise memories into which data is loaded from memory 208 for generation of representations by display device 216.

Mobile electronic device 104 also includes a communications interface 228 interconnected with processor 204. Communications interface 228 allows mobile electronic device 104 to communicate with other computing devices via links 108 and 112 and their respective networks. It will be understood that communications interface 228 can therefore be selected for compatibility with links 108 and 112 as well as with networks 116 and 120.

Mobile electronic device 104 can also include various other components. For example, output devices (not shown) such as a speaker, a light-emitting indicator such as a Light Emitting Diode (LED), a motor for vibrational output, and the like, are all contemplated. The various components of mobile electronic device 104 are interconnected, for example via a communication bus (not shown). Mobile electronic device 104 can be powered by a battery (not shown).

Mobile electronic device 104 can include a phone application 232 maintained in memory 208. Phone application 232 can comprise computer readable instructions for execution by processor 204. In general, processor 204 can be configured, by execution of phone application 232, to perform various actions as discussed below.

Figure 3:
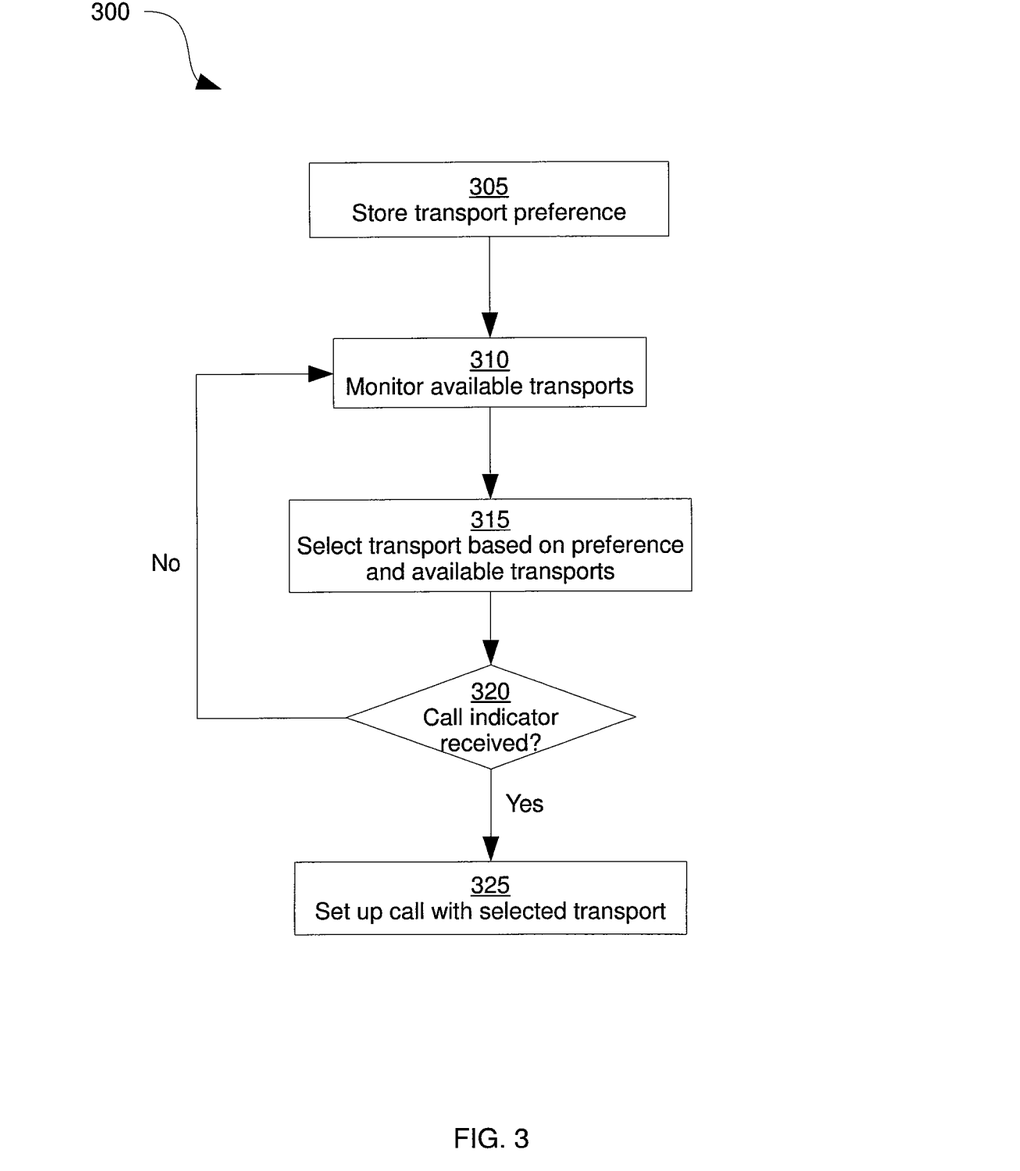
FIG. 3 depicts a method of managing call transports in the mobile electronic device of FIG. 2, according to a non-limiting embodiment.

Turning to FIG. 3, a flowchart of a method 300 of managing call transports is depicted. Method 300 will be discussed in conjunction with its performance on mobile electronic device 104 within system 100, though it will be understood that method 300 need not be performed solely in this context.

At block 305, processor 204 can be configured, via execution of phone application 232, to maintain a transport preference within memory 208. Referring briefly to FIG. 2, transport preference 236 is shown being maintained within memory 208. Transport preference 236 can include at least an identifier of a preferred transport to be used by phone application 232 in setting up communications such as voice calls.

Figure 4:
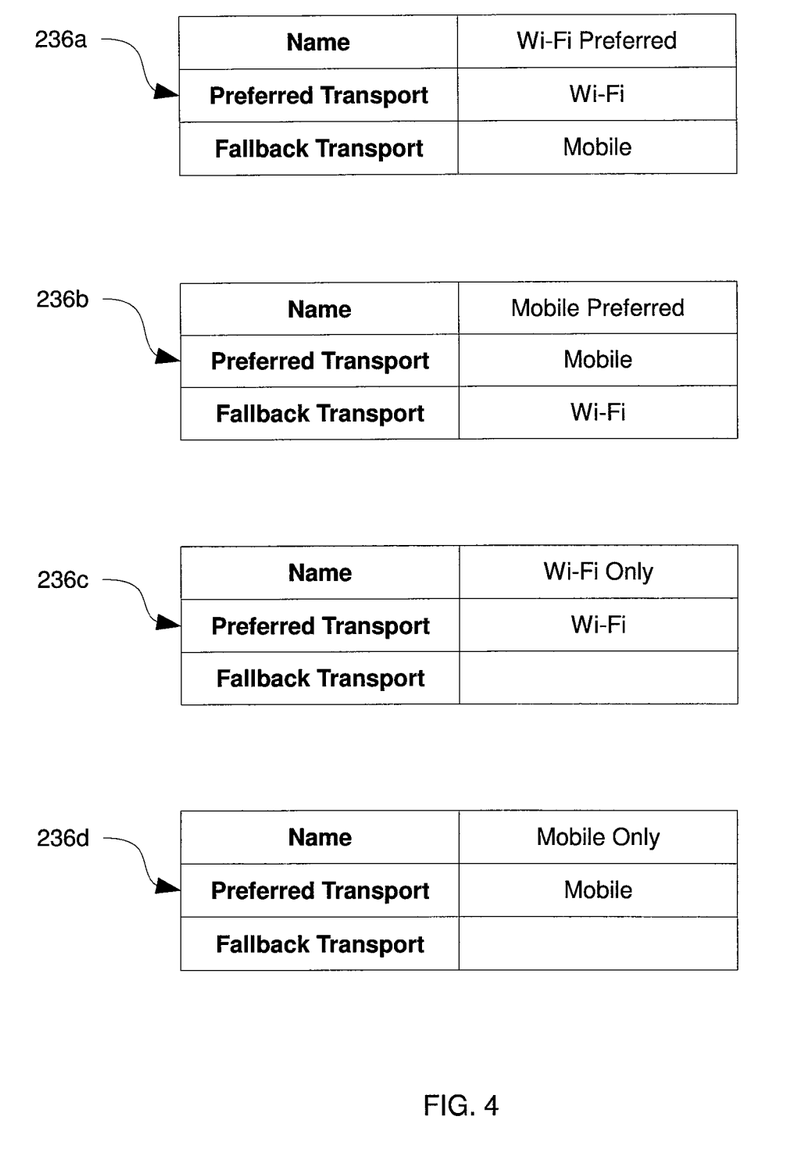
FIG. 4 depicts transport preferences, according to a non-limiting embodiment.

Referring now to FIG. 4, four different transport preferences 236a, 236b, 236c and 236d are represented. It will now be apparent that transport preference 236 maintained in memory 208 can be any one of the transport preferences shown in FIG. 4. As can be seen in FIG. 4, each transport preference 236 includes at least an identifier of a preferred transport. In particular, transport preferences 236a, named "Wi-Fi Preferred," and 236c, named "Wi-Fi Only," each include an identifier for a Wi-Fi transport as the preferred transport. Transport preferences 236b, named "Mobile Preferred" and 236d, named "Mobile Only," each include an identifier for a mobile transport as the preferred transport.

As can also be seen in FIG. 4, a transport preference 236 can also include an identifier of a fallback transport to be used by phone application 232 in setting up communications. In particular, transport preferences 236a and 236b include identifiers for the mobile and Wi-Fi transports, respectively, as the fallback transports to be used in the event that the preferred transports are unavailable. Transport preferences 236c and 236d do not include identifiers of fallback transports.

In some embodiments, all four of the above-mentioned transport preferences 236a, 236b, 236c and 236d can be maintained in memory 208. In such embodiments, the selected or "active" transport preference 236 can be marked by a flag or other indicator detectable by processor 204. It will now be apparent that an active transport preference can be selected by a variety of means. In some embodiments, input data received at processor 204 from input device 212 can cause processor 204 to mark a particular one of the transport preferences as active. In other embodiments, SMP 164 or enterprise server 144 can transmit transport preference 236 to mobile electronic device 104, for instance in enterprises that enforce policies governing mobile electronic device usage. Such transmissions can also include indications that transport preference 236 cannot be edited (that is, that another transport preference cannot be selected) by way of input data received from input device 212.

Returning to FIG. 3, it will now be apparent that as part of the performance of block 305 of method 300, processor 204 can be configured to maintain transport preference 236 in any suitable format. For example, although transport preferences 236a, 236b, 236c and 236d have been shown in tabular formats with plain text headings and transport identifiers, transport preference 236 can take a variety of other formats. For instance, transport preference 236 can be maintained as a numerical identifier in memory 208 which is understood by processor 204 as being equivalent to one of the transport preferences illustrated in FIG. 4.

Proceeding to block 310, processor 204 can be configured to monitor the available transports. It will now be apparent that block 310 can be performed in conjunction with communications interface 228, which enables links 108 and 112 to be established and maintained. In the context of method 300, a transport is deemed to be "available" when it is currently ready for use in setting up a communication. That is, a transport is available if a link to mobile electronic device 104 using that transport has been established, and the link is determined by processor 204 to be usable in establishing a call. Processor 204 can determine if a link is usable or not by verifying, for example, whether mobile electronic device 104 has permission to use the link for establishing a call, whether the link can be used to successfully communicate with enterprise server 144 and SMP 164, and so on. For example, some WLAN access points may only allow certain types of traffic, to and from mobile electronic device 104, thus preventing links with those access points from being used for calls. In such situations, processor 204 would determine that the Wi-Fi transport is not available as part of the performance of block 310. Identifiers corresponding to the one or more transports deemed available at block 310 can be maintained in memory 208. Such identifiers can be plain text (e.g. "Wi-Fi" or "mobile"), numeric (e.g. "1" for Wi-Fi, "2" for mobile) and the like. Other suitable identifiers will also occur to those skilled in the art.

Figure 5:
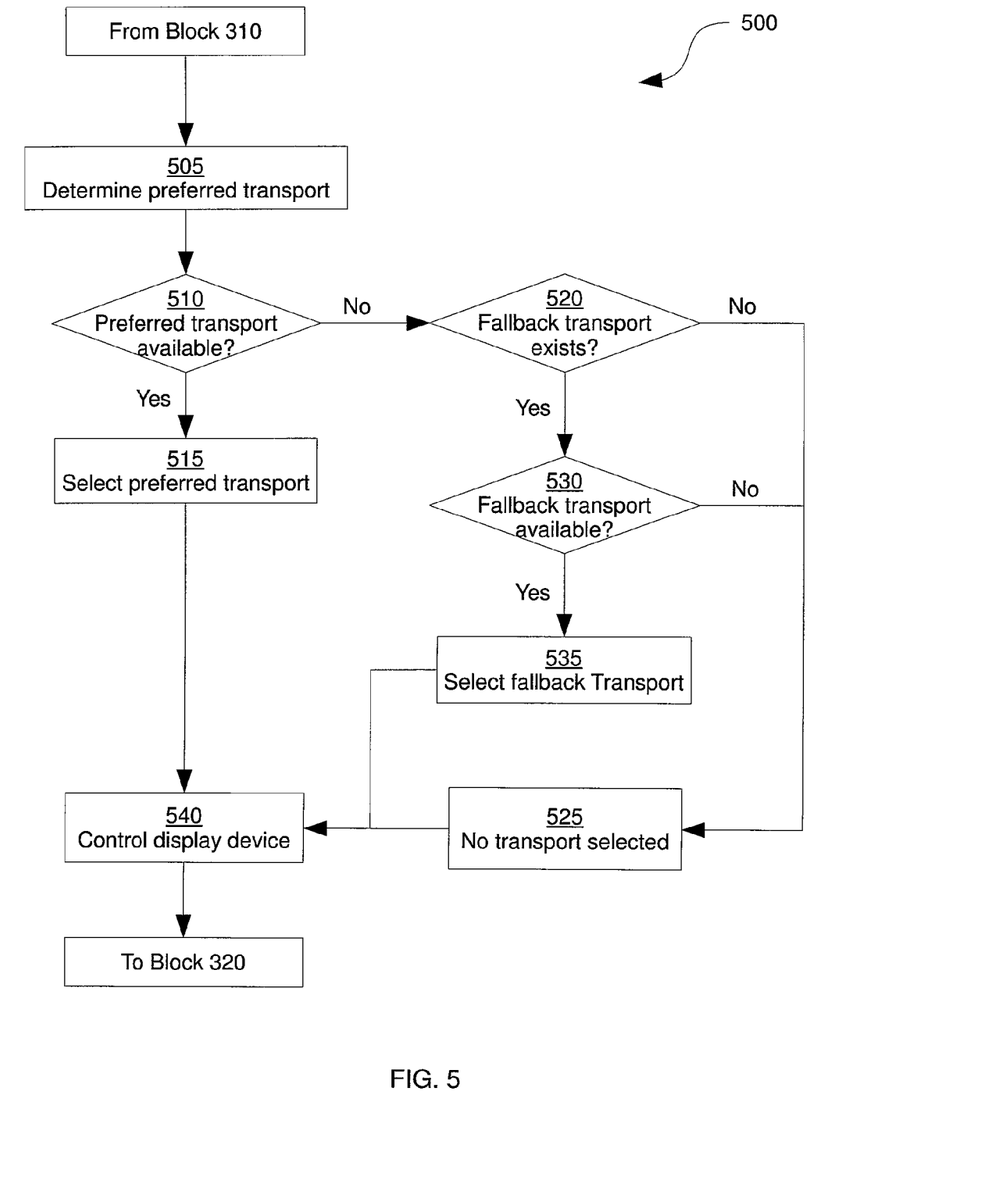
FIG. 5 depicts a method of selecting a transport, according to a non-limiting embodiment.

Following the determination of available transports at block 310, method 300 proceeds to block 315. At block 315, processor 204 can be configured to selected a transport based on transport preference 236 maintained in memory 208 and on the results of the performance of block 310. Turning now to FIG. 5, an exemplary performance of block 315 is depicted as a method 500. Performance of method 500 begins at block 505, at which processor 204 can be configured to determine the preferred transport from transport preference 236. For example, if transport preference 236 includes an identifier for the Wi-Fi transport as the preferred transport, processor 204 can determine at block 505 that Wi-Fi is the preferred transport.

Proceeding to block 510, processor 204 can be configured to determine if the preferred transport is available. The determination at block 510 can be made by comparing the results of the performance of block 310 with the identity of the preferred transport determine at block 505. If the preferred transport as determined at block 505 is among the transports deemed to be available at block 310, the determination at block 510 is affirmative and method 500 advances to block 515. At block 515, the preferred transport is selected. It will be appreciated that an identifier of the selected transport can be maintained in memory 208.

If the determination at block 510 is negative—that is, if the preferred transport determined from transport preference 236 is not available—method 500 proceeds to block 520, where processor 204 can be configured to determine whether an identifier of a fallback transport exists within transport preference 236. If, as in transport preferences 236c and 236d, no fallback transport is defined, the determination at block 520 will be negative and method 500 will proceed to block 525, where method 500 is completed without a transport being selected. It will be appreciated that when no transport is selected, mobile electronic device 104 will be unable to receive or initiate calls. If, on the other hand, a fallback transport is defined in transport preference 236 (for example, if transport preference 236 is one of transport preferences 236a and 236b), method 500 proceeds to block 530.

At block 530, processor 204 can be configured to determine whether the fallback transport identified at block 520 is among the transports deemed to be available at block 310. If the determination at block 530 is negative—that is, if the identified fallback transport is not available—then method 500 proceeds to block 525, where no transport is selected. If the determination at block 530 is affirmative, however, then method 500 proceeds to block 535. At block 535, processor 204 can be configured to select the fallback transport identified in transport preference 236.

Figure 6:
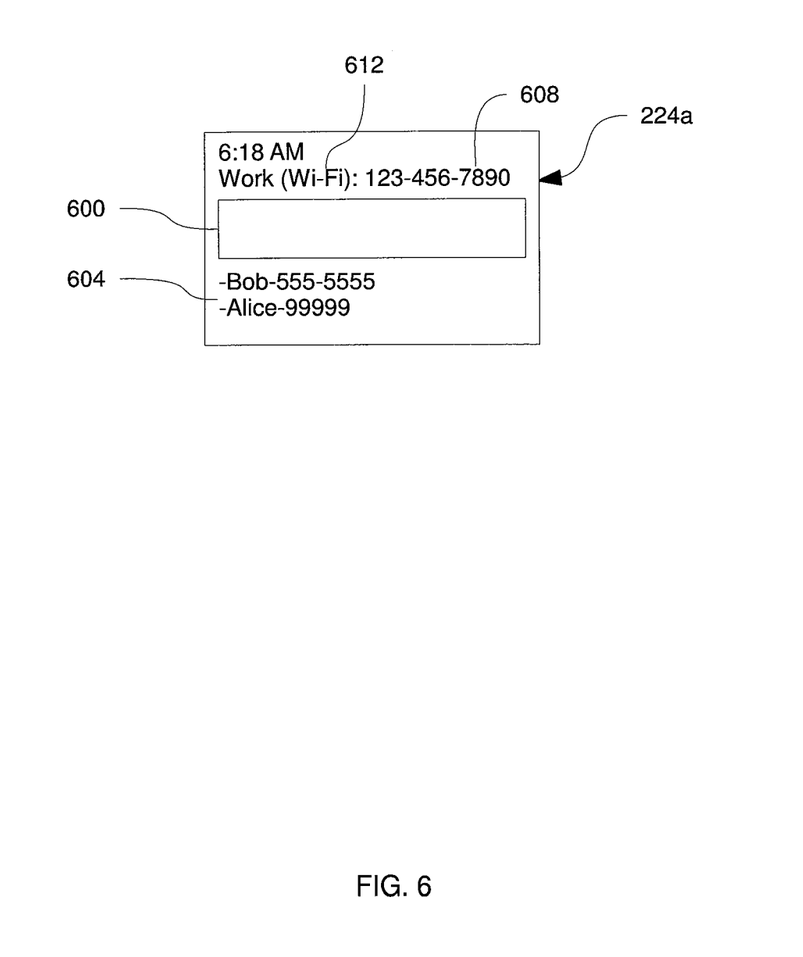
FIG. 6 depicts a representation of data generated on a display of the mobile electronic device of FIG. 2, according to a non-limiting embodiment.

From any of blocks 515, 525 and 535, method 500 can proceed to block 540, at which processor 204 can be configured to control display device 216 and circuitry 220 to generate a representation 224 of data including a label or other identification for the selected transport. Turning to FIG. 6, various exemplary representations are shown, as generated by display device 216 under the control of processor 204 executing phone application 232. In particular, a first representation 224a is of data constituting a phone idle screen. The phone idle screen can include a dialing area 600 for entering digits to dial and a call log listing recent incoming and outgoing calls, represented at 604. The phone idle screen can also include an identification of a telephone number or other identifier for mobile electronic device 104, represented at 608. In addition, the phone idle screen can include an identification, represented at 612, of the currently selected transport to be used by phone application 232 in the event that a call is initiated or received by mobile electronic device 104. It will be appreciated that identification 612 can take any suitable form. For example, identification 612 can comprise text as shown in FIG. 6. In other embodiments, identification 612 can comprise any one of, or any suitable combination of, text, icons, symbols and the like. It will now be apparent that when no transport was selected (that is, method 500 proceeded to block 525), identification 612 can be omitted, or replaced with the word "none" or any other suitable visual indication that no transport is currently selected.

Returning to FIG. 3, it will be appreciated that other suitable manners of performing 315 can also be used, in addition to or instead of that described above in conjunction with FIG. 5.

Following selection of a transport at block 315, method 300 can proceed to block 320. At block 320, processor 204 can be configured to determine whether a call indicator has been received. Such a call indicator can comprise input data received from input device 212 instructing processor 204 to initiate a call. Such a call indicator can also comprise a call request received from another computing device, such as PBX 148 or SMP 164. If the determination at block 320 is negative, indicating that phone application 232 remains in an "idle" mode, processor 204 can be configured to return to the performance of block 310, to continue monitoring available transports and updating transport selection when necessary. Thus, the selected transport is dynamically updated based on the current connectivity environment of mobile electronic device 104. It will now be apparent to those skilled in the art that performance of block 320 need not depend on performance of blocks 310 and 315. In other words, in some embodiments, processor 204 can be configured via execution of phone application 232 to monitor and select transports (as in blocks 310 and 315) and, substantially simultaneously (via a second thread or process within processor 204, for example), to monitor for call indicators. Thus, the determination at block 320 need not be made dependent on the performance of block 315.

If, on the other hand, the determination at block 325 is affirmative, meaning an incoming call request has been detected or an outgoing call command has been received, for example from input device 212, method 300 proceeds to block 325. At block 325, processor 204 can be configured to set up, or initialize, the call using the currently selected transport. Performance of block 325 can comprise sending a call initiation request to SMP 164, such as the INVITE message shown in Table 1, including an indication of which transport mobile electronic device 104 will use for the call. The message of Table 1 thus includes a "t" parameter indicating that mobile electronic device 104 wishes to use the PBX Mobile (PBXM) transport for the call. For incoming calls received at mobile electronic device 104, performance of block 325 can comprise sending a response (such as the OK message shown in Table 2) including an indication of which transport mobile electronic device 104 will use to accept the call. The message of Table 2 thus includes a "t" parameter indicating that mobile electronic device 104 wishes to use the Wi-Fi transport to accept the call. It will now be apparent that the signalling used in setting up calls can be based on any suitable protocols that will occur to those skilled in the art, such as Session Initiation Protocol (SIP) or SIP-like protocols. For example, the call initiation request and response mentioned above can be transmitted from mobile electronic device 104 to SMP 164 using a SIP-like protocol with binary, rather than plain text, messaging.

TABLE 1

Exemplary INVITE Message for Device-Originated Call

'REQUEST: INVITE'
'Call-ID: 8581230951757654362 uid: 2559411320'
'Sequence-ID: 1'
'From: "Alice Smith"<boss:99999@bbs-sip5sm1>'
'To: <boss:99999@bbs-sip5sm1>'
'TimeStamp: 1269350741977'
'App-Id: mvsFmcClient'
App: 'Content-Type: application/fmc'

TABLE 1-continued

Exemplary INVITE Message for Device-Originated Call

App: 'MVS Uid: 2559411320
'body index [ 0 ]'
'v:1
'i:434113299'
't:pbxm'

TABLE 2

Exemplary OK Message for Device-Terminated Call

'RESPONSE: 200 [0x512]'
'Call-ID: 8587700953400242394 uid: 1999479940'
'Sequence-ID: 49195'
'App-Id: mvsFmcClient'
'Content-Type: application/fmc'
'MVS Uid: 1999479940'
'body index [ 0 ]'
'v:1'
'i:862685144'
't:wifi'

Figure 7:
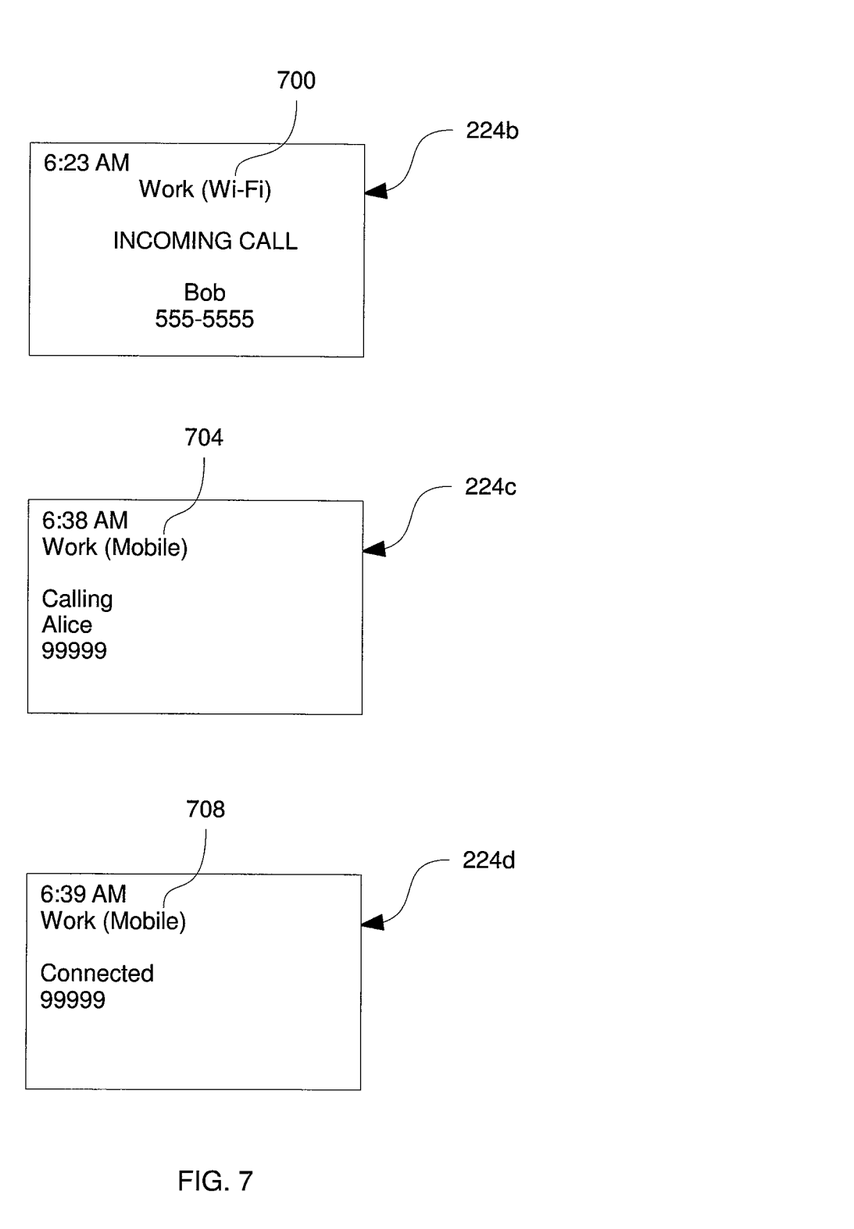
FIG. 7 depicts additional representations of data generated on a display of the mobile electronic device of FIG. 2, according to a non-limiting embodiment.

Performance of block 325 can also comprise controlling display device 216 to generate updated representations 224 to reflect call status. Referring to FIG. 7, exemplary representations 224b, 224c and 224d are shown. Representation 224b is of data constituting an incoming call screen of phone application 232. Representation 224c is of data constituting an outgoing call screen of phone application 232, and representation 224c is of data constituting a connected call screen of phone application 232. Representations 224b, 224c and 224d include respective identifications, 700, 704 and 708 of the transports being used for the incoming, outgoing and connected calls. It will now be apparent that if, during the course of a call, the call is handed over to a different transport, processor 204 can be configured to control display device 216 to update identification 708 of representation 224d accordingly.

It will now be apparent that other variations can also be made to the methods and system described herein. For example, in other embodiments, application 232 can be maintained on computer readable storage media other than memory 208. Exemplary computer readable storage media include fixed, tangible storage media readable directly by processor 204 (e.g., removable diskette, CD-ROM, ROM, fixed disk, USB drive). Other exemplary computer readable storage media include remote storage from which computer readable instructions are transmittable to processor 204.

Those skilled in the art will appreciate that in some embodiments, the functionality of application 232 can be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of managing transports at a mobile electronic device, the method comprising:
maintaining a plurality of transport preferences in a memory of the mobile electronic device, the transport preferences including an identifier of a preferred transport, and one of the plurality of transport preferences being maintained in association with a flag marking it as the active transport preference, the preferred transport being one of a Wireless Local Area Network transport and a mobile transport;

monitoring available transports, wherein an available transport comprises a transport over which a link to the mobile electronic device has been established;

selecting a transport for use based on the plurality of transport preferences and the available transports;

responsive to selecting the transport, controlling a display device of the mobile electronic device to generate a representation comprising an identification of a selected transport;

receiving a call indication; and sending an instruction from the mobile electronic device addressed to a session management platform (SMP) server, comprising a parameter including a name of the selected transport, for instructing the SMP server to set up the call using the selected transport.

2. The method of claim 1, further comprising: repeating the monitoring and selecting; and dynamically updating the representation to reflect changes in the selected transport.

3. The method of claim 1, wherein monitoring available transports comprises:
   identifying at least one transport over which a link to the mobile electronic device has been established;
   determining that the mobile electronic device has permission to use the link for establishing a call; and
   maintaining an identifier of the at least one transport in the memory.

4. The method of claim 1, wherein selecting a transport comprises:
   determining a preferred transport from the plurality of transport preferences;
   when the preferred transport is available, selecting the preferred transport;
   when the preferred transport is not available, determining whether a fallback transport preference exists;
   when a fallback transport preference exists and the fallback transport is available, selecting the fallback transport.

5. The method of claim 1, further comprising:
   receiving an indication of which of the plurality of transport preferences is to be marked as active.

6. The method of claim 5, wherein the indication includes a further indication that the selected transport cannot be changed as a result of input data received from an input device of the mobile electronic device.

7. The method of claim 1, wherein the plurality of transport preferences includes a further identifier of a fallback transport.

8. A mobile electronic device, comprising:
   a memory for maintaining a plurality of transport preferences in a memory of the mobile electronic device, the transport preferences including an identifier of a preferred transport, and one of the plurality of transport preferences being maintained in association with a flag marking it as the active transport preference, the preferred transport being one of a Wireless Local Area Network transport and a mobile transport;
   a communications interface;
   a display device; and,
   a processor interconnected with the memory and the communications interface, the processor configured to:
   monitor available transports, wherein an available transport comprises a transport over which a link to the mobile electronic device has been established; to select a transport for use based on the plurality of transport preferences and the available transports; and, responsive to selecting the transport, control the display device to generate a representation comprising an identification of a selected transport;
   the processor further configured to receive a call indication; and to send an instruction addressed to a session management platform (SMP) server, comprising a parameter including a name of the selected transport, for instructing the SMP server to set up the call using the selected transport.

9. The mobile electronic device of claim 8, the processor being further configured to repeat the monitoring and selecting; and to dynamically update the representation to reflect changes in the selected transport.

10. The mobile electronic device of claim 8, the processor being further configured to monitor available transports by:
    identifying at least one transport over which a link to the mobile electronic device has been established;
    determining that the mobile electronic device has permission to use the link for establishing a call; and
    maintaining an identifier of the at least one transport in the memory.

11. The mobile electronic device of claim 8, the processor being further configured to select a transport by:
    determining a preferred transport from the plurality of transport preferences;
    when the preferred transport is available, selecting the preferred transport;
    when the preferred transport is not available, determining whether a fallback transport preference exists;
    when a fallback transport preference exists and the fallback transport is available, selecting the fallback transport.

12. The mobile electronic device of claim 8, the processor being further configured to receive an indication of which of the plurality of transport preferences is to be marked as active.

13. The mobile electronic device of claim 12, wherein the indication includes a further indication that the selected transport cannot be changed as a result of input data received from an input device of the mobile electronic device.

14. The mobile electronic device of claim 8, wherein the plurality of transport preferences includes a further identifier of a fallback transport.

15. A non-transitory computer readable storage medium for storing computer readable instructions for execution by a processor, the computer readable instructions implementing a method of managing transports, the method comprising:
    maintaining a plurality of transport preferences in a memory of the mobile electronic device, the transport preferences including an identifier of a preferred transport, and one of the plurality of transport preferences being
    maintained in association with a flag marking it as the active transport preference, the preferred transport being one of a Wireless Local Area Network transport and a mobile transport;
    monitoring available transports, wherein an available transport comprises a transport over which a link to the mobile electronic device has been established;
    selecting a transport for use based on the plurality of transport preferences and the available transports;
    responsive to selecting the transport, controlling a display device of the mobile electronic device to generate a representation comprising an identification of a selected transport;
    receiving a call indication; and sending an instruction from the mobile electronic device addressed to a session management platform (SMP) server, comprising a parameter including a name of the selected transport, for instructing the SMP server to set up the call using the selected transport.

16. A method of managing transports at a mobile electronic device, the method comprising:

maintaining a transport preference in a memory of the mobile electronic device, the transport preference including an identifier of a preferred transport, the preferred transport being one of a Wireless Local Area Network transport and a mobile transport;

monitoring available transports, wherein an available transport comprises a transport over which a link to the mobile electronic device has been established;

selecting a transport for use based on the transport preference and the available transports by: determining a preferred transport from the transport preference; when the preferred transport is available, selecting the preferred transport; when the preferred transport is not available, determining whether a fallback transport preference exists; and, when a fallback transport preference exists and the fallback transport is available, selecting the fallback transport;

responsive to selecting the transport, controlling a display device of the mobile electronic device to generate a representation comprising an identification of a selected transport;

receiving a call indication; and sending an instruction from the mobile electronic device addressed to a session management platform (SMP) server, comprising a parameter including a name of the selected transport, for instructing the SMP server to set up the call using the selected transport.

* * * * *